Aug. 12, 1969  J. R. BOTTERILL  3,460,652
ANTI-NOISE DISK BRAKE
Filed Nov. 30, 1967  3 Sheets-Sheet 1

INVENTOR.
JOHN R. BOTTERILL
BY
Karl F. Ross
ATTORNEY

Aug. 12, 1969  J. R. BOTTERILL  3,460,652
ANTI-NOISE DISK BRAKE
Filed Nov. 30, 1967  3 Sheets-Sheet 2
FIG.4
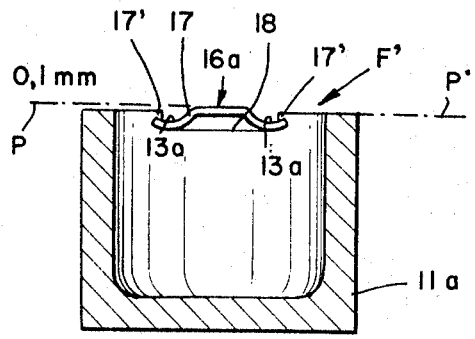
FIG.6
FIG.5
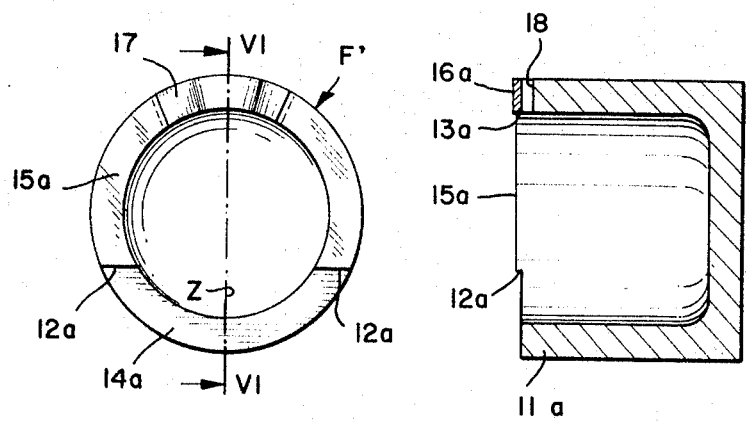
INVENTOR.
JOHN R. BOTTERILL
BY
Karl F. Ross
ATTORNEY Aug. 12, 1969   J. R. BOTTERILL   3,460,652
ANTI-NOISE DISK BRAKE
Filed Nov. 30, 1967   3 Sheets-Sheet 3
FIG.7
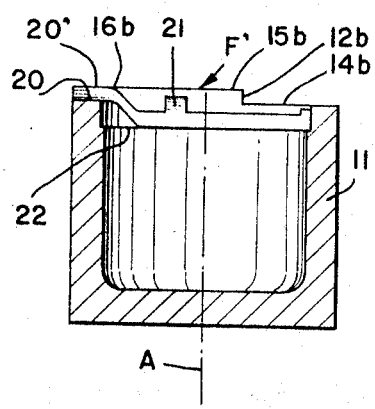
FIG.9
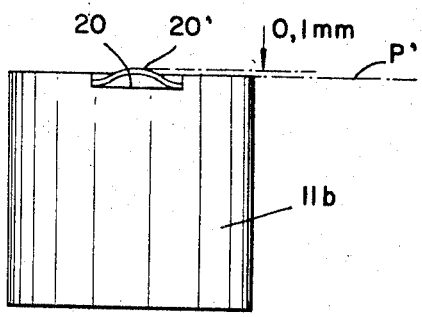
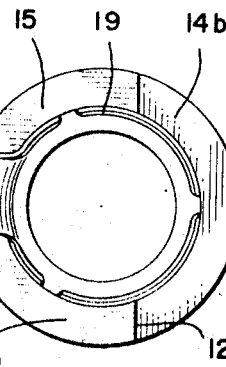
FIG.8
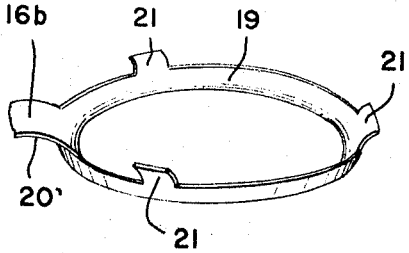
FIG.10
INVENTOR.
JOHN R. BOTTERILL
BY
Karl G. Ross
ATTORNEY

United States Patent Office 3,460,652
Patented Aug. 12, 1969

3,460,652
ANTI-NOISE DISK BRAKE
John Redvers Botterill, Rugby, Warwickshire, England, assignor to Alfred Teves G.m.b.H., Frankfurt am Main, Germany, a corporation of Germany
Filed Nov. 30, 1967, Ser. No. 687,043
Claims priority, application Germany, Dec. 1, 1966, T 32,647
Int. Cl. F16d 55/00, 65/14
U.S. Cl. 188—73                         13 Claims

ABSTRACT OF THE DISCLOSURE

A fixed-yoke disk brake having a piston bearing against the brakeshoe with a stepped annular contact face with a pair of major steps and a further step in axially offset relationship, the further step having a height of about 0.1 mm. and contacting the backing plate of the brakeshoe.

---

My present invention relates to disk-type brakes and, more particularly, to a disk-type brake having means for preventing brake squealing and noise.

In the commonly assigned copending applications Ser. No. 601,013, now U.S. Patent No. 3,409,106 of Nov. 5, 1968, and Ser. No. 672,757, filed Dec. 12, 1966, and Oct. 4, 1967, by Ernst Meier and Hermann Seip and by Hans Joachim Anders, respectively, there are described systems for reducing the noise produced by disk brakes upon the application of brake pressure. In these applications it is pointed out that, when the brake piston bears centrally (i.e. along its axis) upon the backing plate of a brakeshoe, the nonuniform wear of the brake lining due to higher surface speeds at greater distances from the center of rotation of the disk, results in a canting of the brakeshoe which is associated with the generation of brake noise during the application of the disk brakes. A disk-brake system of this general type comprises a fixed yoke or housing whose lobes are disposed on opposite sides of a brake disk, which is rotatably secured to the axle or wheel of the automotive vehicle, and are connected by a bridge piece joining the lobes together. In general, a yoke or housing is secured by a flange to the axle housing associated with the wheel and thus has one lobe which is affixed directly to the axle housing while the other lobe is cantilevered on the other side of the disk. Thus one may refer to the flange side of the yoke and the wheel side of the yoke since, in an automotive-vehicle wheel brake, the tire-supporting disk is secured to the brake disk along the side of the latter at which the unsupported lobe is disposed. In the aforementioned applications, systems are described in which the contact between the piston and the brakeshoe is intentionally made offcenter, either by cutting away the piston so that it bears upon the backing plate at a location spaced from the center of the wheel-brake cylinder and its piston, or by interposing a contact plate between the brakeshoe and the piston which effects offcenter-force transmission between them. The pistons are axially shiftable in cylinders formed on the respective lobes of the brake-yoke hydraulic means, e.g. a wheel-brake cylinder which is actuated by the operator of the vehicle via the brake pedal. The brakeshoes usually consist of backing plates of steel which are directly engaged by the respective pistons, carrying brake linings of a high frictional coefficient, good resistance to oil and heat, and frictionally erodable in preference to the brake disk. The brakeshoes flank the disk and are axially shiftable by the pistons toward and away from annular braking faces of the latter.

It is the principal object of the present invention to provide improvements in quieting disk-type brakes which extend the principles originally set forth in the aforementioned applications but which provide simplified and improved structures by comparison therewith.

Another object of this invention is to provide a system for quieting the operation of disk-type brakes, which is effective from the beginning of brakeshoe use without waiting, for example, for a preliminary wear of, say 10% to 15% before the intermediate plate between a piston and its brakeshoe can be introduced in accordance with one of the aforementioned techniques.

Still another object of this invention is to provide an improved and relatively silent disk-type brake which does not alter the effective thickness of the brake lining.

I have now found that it is unnecessary to wait for a brake-lining wear of about 10–15%, as has been the case when intervening plates having a thickness of about 1 mm. have been introduced to render the contact between the piston and the brakeshoe offcenter, or to reduce the thickness of the brake lining if an intervening plate is to be used from the beginning, when the disk-type brake has a piston whose annular end confronting the brakeshoe is stepped (i.e. provided with at least three steps) to afford a limited zone of contact with the backing plate of the shoe.

According to a more specific feature of my invention, the hydraulic disk brake, which does not require an intermediate plate, is provided with a wheel-brake piston of cylindrical cup-shaped configuration which opens in the direction of the backing plate of the brakeshoe. The piston thus has an annular rim juxtaposed with the backing plate of the brakeshoe and forming the contact surface by which the piston applies force to the shoe. To minimize brake noises and especially squealing without changing the usable thickness of the brake lining and without using an intermediate plate, the piston is provided with a plurality of axially staggered but planar steps, i.e. at least three axially staggered zones, which lie in planes parallel to the backing plate of the disk but are offset one from the other by cutting away the annular contact end of the piston. Advantageously, the third step has a height less than the first step and of approximately 0.1 mm. The third or additional step is closest to the backing plate and is compressible as will be apparent hereinafter.

According to a further feature of this invention, the further (third) step or surface is disposed symmetrically with respect to the first and second steps and an axial plane through the piston, the further surface having a substantially smaller area than the surfaces of the other two steps. In another embodiment of this invention, the further step or surface is generally parallel to the first step although another variant provides the further step in perpendicular or transverse relationship to the first step. Both of these systems afford improved noise reduction in the brake.

I have also found that it is desirable to provide the predetermined resilience of the additional step by providing it with a recess in which a spring plate is seated. Whenever the spring plate is used, the noise reduction is improved still further. The third step of the piston may also have a recess into which a tongue or other formation of a sheet metal ring can project, the ring being provided with circumferentially spaced lugs and being recessed within the piston, the lugs being press-fitted into the piston. The ring may thus be fully received in the piston except for the aforementioned tongue which constitutes a resilient formation at the third step.

The above and other objects, features, and advantages of the present invention will become more readily apparent from the following description, reference being made to the accompanying drawing in which:

FIG. 4 is an axial cross-sectional view of another piston embodying this invention;

FIG. 5 is an end view of this piston;

FIG. 6 is a cross-sectional view taken along the line VI—VI of FIG. 5;

FIG. 7 is an axial cross-sectional view of another embodiment of this invention;

FIG. 8 is an end view of the embodiment of FIG. 7;

FIG. 9 is a side elevational view taken in the direction of arrow IX of FIG. 8;

FIG. 10 is a perspective view of the ring of FIGS. 7–9; and

Figure 1:
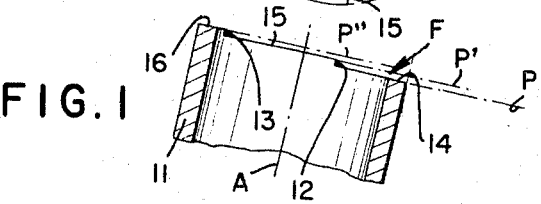
FIG. 1 is an axial cross-section view of a wheel-brake piston according to this invention.
Figure 11:
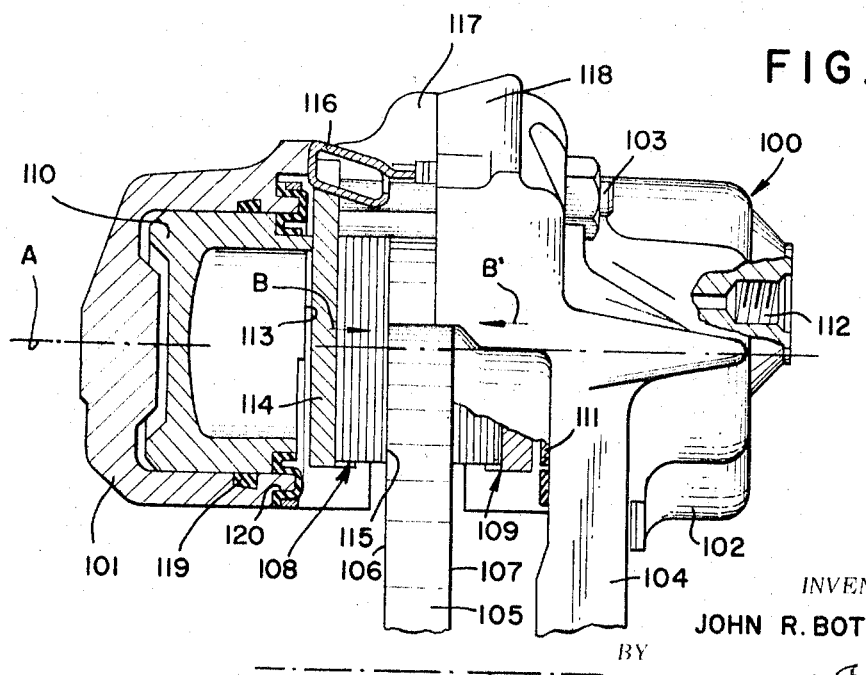
FIG. 11 is an overall view, partly in section, of a brake embodying the present invention.

Referring first to FIG. 1 in which I show an overall view of a wheel-brake system embodying the present invention, it can be seen that the fixed-yoke disk brake comprises a brake yoke 100 having a pair of wheel-brake cylinders 101 and 102 interconnected by bolts 103 to form the support which is affixed to a stationary part of the vehicle by a flange 104. The stationary part of the vehicle is usually a flange of the axle housing. The wheel or its axle is rotatable with brake disk 105 whose annular braking faces 106 and 107 lie in planes perpendicular to the axis X of rotation of the disk 105. A pair of brakeshoes 108, 109 confront the brake faces 106 and 107, respectively, of the disk and are shiftable toward and away from the latter (arrows B and B') by a pair of wheel-brake pistons 110 and 111. Only the wheel-brake piston 110 will be described in detail here, the other piston being of similar construction. Brake fluid is fed from a master cylinder, actuated by the usual brake pedal, to the yoke 100 via a port 112 from which it is distributed to the wheel-brake cylinders 101 and 102 behind the respective pistons 110 and 111. The latter are generally cup-shaped and are of cylindrical configuration so as to have each an annular abutment face 113 adapted to bear against the backing plate 114 of the brakeshoe (e.g. brakeshoe 108). The backing plate carries a lining 115 which, when an intermediate plate is used, must have a reduced thickness to accommodate this intermediate plate. The brakeshoe (108 or 109) is guided and retained by the usual spring clip 116 and may be removed radially through an opening 117 in the bridge piece 118 connecting the lobes of the yoke. A seal 119, recessed in the wall of the respective cylinder 101 or 102, engages the piston 110 or 111 to prevent escape of the brake fluid around the periphery of the piston. A dust-excluding seal 120 prevents entry of contaminants between the piston and the cylinder wall.

In normal operation, brake fluid is supplied at port 112 and is delivered to the brake cylinders 101, 102 to force the pistons 110 and 111 in the direction of arrows B and B', respectively. The brakeshoes 108 and 109 are thus brought to bear against the faces 106 and 107 of the disk and frictionally slow the latter with respect to the axle housing.

Figure 2:
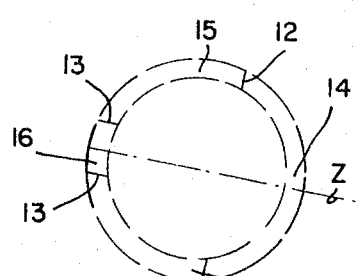
FIG. 2 is an end view of the contact surface thereof.
Figure 3:
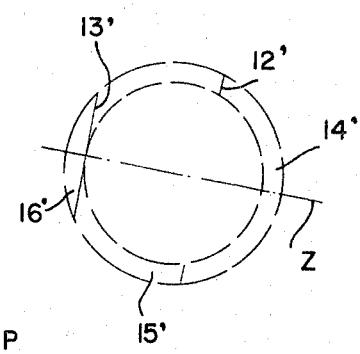
FIG. 3 is an end view of a piston according to another embodiment of this invention.

Under the principles originally set forth in the aforementioned copending application, squealing and like brake noises are avoided by providing a stepped contact surface (e.g. 113) which may initially bear upon the backing plate 114 at a location offset from the axis A of the device. In this embodiment, a three-step contact face is provided as is described in greater detail hereinafter with reference to FIGS. 1–3. In FIGS. 1–3, I show a wheel-brake piston 11, analogous to the pistons 110 and 111 previously described, which is adapted to be used in a hydraulically operated, fixed-yoke fisk brake. The contact face F at the open end of this piston is formed with a setback 12 which defines an upper step surface 15 and a lower step surface 14 extending along sectors of the annular contact face. This two-step arrangement, the principles of which have been described in the first of the aforementioned applications, already has been demonstrated to reduce the noise generated by the brake during brake application.

According to this invention, however, an additional setback 13 is provided which defines a third step surface 16 of a height less than the height of the setback 12 and preferably about 0.1 mm. The surface 14 lies in a plane P which is offset axially from a plane P' the latter, in turn, being axially offset from the plane P'' of the step surface 16. The planes P, P' and P'' are perpendicular to the axis A of the piston. As noted earlier, the step surface 16 extends arcuately over a minor fraction of the arcuate extent of the surfaces 14 and 15 so that its area is relatively small by comparison with the area of the major steps 14 and 15. The surface area ratio of the third step 16 to the steps 14 and 15 may range from 1:3 to 1:6 so that the fraction of the contact surface occupied by the third step is between ⅙ and 1/12. As can be seen from FIG. 2, the setback 13 between the third step 16 and step 15 is substantially perpendicular to the step or setback 12 while in FIG. 4, the setback 13' of step 16' is parallel to the setback 12' between the major steps 14' and 15'.

In FIGS. 4–6, I show another embodiment of this invention wherein the piston 11a has an annular abutment surface F' formed with major steps 14a and 15a lying in parallel axially offset planes and separated by the step 12a as previously described. In this embodiment, however, the third step 16a is formed by inserting an upwardly bowed, arc-segmental spring plate 17 into a recess 18 formed in the abutment face F' of the piston. The contact surface of this spring plate lies about 0.1 mm. above the plane P' of step 15a. Here the upwardly extending flanks 13a of the metal insert 17 form the setback by which the step 16a is offset. In this embodiment and in the embodiments of FIGS. 1–3, the contact zones 14, 15, 16, 14', 15', 16' and 14a, 15a, 16a are symmetrical about the axial plane Z through the piston.

In FIGS. 7–10, I show still another system in which a spring forms the additional step 16b. In this embodiment, a recess 20 is formed in the contact surface F'' of the piston 11b which has the major steps 14b and 11b separated by a setback 12b. The recess 20 is radial with respect to the axis A of the piston 11b and receives a radial tongue 20' which, as can be seen in FIG. 9, is upwardly bold to define the step 16b at a distance of approximately 0.1 mm. above the plane P' of step 15b. The tongue 20' is stamped integrally forming ring 19 which carries a plurality of outwardly flared lugs 21 angularly spaced about the ring. These lugs engage the inner wall of the piston 11b at an annular recess 22 therealong and, by their inherent outward elasticity lock the ring in place. The ring is forced axially into the mouth of the piston. Thus lugs 21 serve to hold the third abutment surface 16b in place in the embodiment of FIGS. 7–10 while overhangs 17 retain the spring plate 17' in place in the embodiment of FIGS. 4–6.

The invention described and illustrated is believed to admit of many modifications within the ability of persons skilled in the art.

I claim:

1. In a disk brake having a fixed brake yoke extending around the periphery of a rotatable brake disk, at least one brakeshoe confronting a brake face of said disk, a piston in said yoke hydraulically shiftable to urge said brakeshoe against said face and bearing upon said brakeshoe, the improvement wherein said piston has an annular contact surface confronting the brakeshoe and provided with at least three generally sectoral steps including a minor step bearing against said brakeshoe and a pair of major steps axially offset from one another and from said minor step away from said brakeshoe, said steps being symmetrical about an axial plane of said piston, one of said major steps being subdivided into two arc segmental portions flanking said minor step and the other major step.

2. The improvement defined in claim 1 wherein said mnior step is offset axially from one of said major steps by a first setback and said one of said major steps is offset from the other major step by a second setback, said setbacks extending subtantially perpendicularly to one another.

3. The improvement defined in claim 1 wherein said minor step is offset axially from one of said major steps by a first setback and said one of said major steps is offset from the other major step by a second setback, said setbacks being substantially parallel to one another.

4. The improvement defined in claim 1 wherein said minor step has a step height less than the step height separating said major steps.

5. The improvement defined in claim 4 wherein the height of said minor step is about 0.1 mm.

6. The improvement defined in claim 4 wherein said minor step has a surface area substantially smaller than the surface area of each of said major steps.

7. In a disk brake having a fixed brake yoke extending around the periphery of a rotatable brake disk, at least one brakeshoe confronting a brake face of said disk, a piston in said yoke hydraulically shiftable to urge said brakeshoe against said face and bearing upon said brakeshoe, the improvement wherein said piston has an annular contact surface confronting the brakeshoe and provided with at least three generally sectoral steps incuding a minor step bearing against said brakeshoe and a pair of major steps axially offset from one another and from said minor step, and wherein said minor step is elastically deformable in axial direction.

8. The improvement defined in claim 7 wherein a pair of said pistons is provided on each side of said brake disk and urges respective brakeshoes thereagainst.

9. The improvement defined in claim 7 wherein said minor step has a surface area substantially smaller than the surface of each of said major steps.

10. The improvement defined in claim 7 wherein said annular contact face is formed with a recess and said minor step is an outwardly bowed spring plate received in said recess.

11. The improvement defined in claim 10 wherein said spring plate is a tongue formed on a ring, said piston having a recess receiving said ring, said ring having a plurality of outwardly biased lugs engaging the inner wall of said piston.

12. The improvement defined in claim 7 wherein said minor step has astep height prior to compression less than the step height separating said major steps.

13. The improvement defined in claim 12 wherein the height of said minor step is about 0.1 mm.

References Cited

UNITED STATES PATENTS 3,113,643  12/1963  Botterill _____ 188—73

GEORGE E. A. HALVOSA, Primary Examiner

U.S. Cl. X.R.

188—205